(12) United States Patent
Taieb et al.

(10) Patent No.: US 11,775,705 B2
(45) Date of Patent: Oct. 3, 2023

(54) RESERVOIR SIMULATION MODEL HISTORY MATCHING UPDATE USING A ONE-STEP PROCEDURE

(71) Applicant: Saudi Arabian Oil Company, Dhahran (SA)

(72) Inventors: Yousef Z. Taieb, Dhahran (SA); Faisal Hammad H. AL Naseef, Dhahran (SA); Hamoud Abdulrahman Alqahtani, Dammam (SA); Amell Ali Al-Ghamdi, Dammam (SA); Fouad F. Abouheit, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 539 days.

(21) Appl. No.: 16/856,901

(22) Filed: Apr. 23, 2020

(65) Prior Publication Data
US 2021/0334433 A1 Oct. 28, 2021

(51) Int. Cl.
*E21B 43/00* (2006.01)
*G06F 30/20* (2020.01)
*G06F 111/20* (2020.01)

(52) U.S. Cl.
CPC .............. *G06F 30/20* (2020.01); *E21B 43/00* (2013.01); *G06F 2111/20* (2020.01)

(58) Field of Classification Search
CPC ....... G06F 30/20; G06F 2111/20; E21B 43/00
See application file for complete search history.

(56) References Cited

U.S. PATENT DOCUMENTS

| | | | |
|---|---|---|---|
| 6,580,440 B1 * | 6/2003 | Wagner | G06F 9/451 |
| | | | 715/764 |
| 7,225,078 B2 | 5/2007 | Shelley et al. | |
| 7,805,283 B2 | 9/2010 | Zangl et al. | |
| 8,335,677 B2 | 12/2012 | Yeten et al. | |
| 8,676,557 B2 | 3/2014 | Ding et al. | |
| 9,260,948 B2 | 2/2016 | Maucec et al. | |

(Continued)

OTHER PUBLICATIONS

Tayeb, Yousef Z., Abdullah A. Najem, and Faisal H. Naseef. "Genuine Software Utility to Accelerate Dynamic Models Update." SPE Kingdom of Saudi Arabia Annual Technical Symposium and Exhibition. Society of Petroleum Engineers, 2017.

(Continued)

*Primary Examiner* — Rehana Perveen
*Assistant Examiner* — Cuong V Luu
(74) *Attorney, Agent, or Firm* — Leason Ellis LLP

(57) ABSTRACT

A computer-based method for rapidly updating a history-matched reservoir simulation model selected from among a plurality of history-matched reservoir simulation models hosted on an information technology system. A software module configured to perform an update by parametrically varying the time over the selected update period and the position for each selected well model file and a corresponding well update file, replacing outdated well model file data with well update file data at each respective time and each respective position. The method is configured by selecting a reservoir simulation model for update, a petroleum field model to use, a reservoir model within the field, and one or more wells within the reservoir for the update. The well model files to be updated and the time interval over which the updates are to be made can be set by a user.

19 Claims, 3 Drawing Sheets

(56) References Cited

U.S. PATENT DOCUMENTS

| | | | |
|---|---|---|---|
| 9,703,006 B2 | 7/2017 | Stern et al. | |
| 2006/0224638 A1* | 10/2006 | Wald | G06F 16/2379 |
| 2007/0016389 A1* | 1/2007 | Ozgen | E21B 49/00 |
| | | | 703/10 |
| 2009/0276100 A1 | 11/2009 | Malki et al. | |
| 2015/0153476 A1 | 6/2015 | Prange et al. | |
| 2017/0067323 A1 | 3/2017 | Katterbauer et al. | |
| 2017/0067325 A1* | 3/2017 | Garcia Zurita | E21B 43/00 |
| 2018/0210977 A1 | 7/2018 | Shelley et al. | |
| 2019/0112914 A1 | 4/2019 | Chen | |

OTHER PUBLICATIONS

"Webb, Stephen John, et al. ""Rapid model updating with right-time data—Ensuring models remain evergreen for improved reservoir management."" Intelligent Energy Conference and Exhibition. Society of Petroleum Engineers, 2008."

Holmes, Jay, Duane Allen McVay, and Ozgur Senel. "A System for Continuous Reservoir Simulation Model Updating and Forecasting." Digital Energy Conference and Exhibition. Society of Petroleum Engineers, 2007.

Yuen, Bevan, Olugbenga Olukoko, and Joseph Ansah. "Integrating Intelligent Field Data into Simulation Model History Matching Process." SPE Saudi Arabia Section Technical Symposium and Exhibition. Society of Petroleum Engineers, 2014.

\* cited by examiner

RESERVOIR SIMULATION MODEL HISTORY MATCHING UPDATE USING A ONE-STEP PROCEDURE

FIELD OF THE DISCLOSURE

This patent application relates to methods for updating a reservoir simulation model, and, more particularly, to methods for streamlining and accelerating the process by which newly-obtained field measurements are added to the simulation, thus increasing the simulation's predictive accuracy as operation of the reservoir changes its physical conditions dynamically over time.

BACKGROUND OF THE DISCLOSURE

Hydrocarbon reservoirs are modeled for the purposes of predicting the petroleum production levels from a given reservoir over its service life. The model must account for geological characteristics of the reservoir, which tend to be fixed over time, as well as time-variant parameters of the petroleum being extracted, such as pressures and flow rates. The reservoir is typically divided into cells, and the governing physical equations are applied to the fluid cells using a finite difference or a finite element analysis method.

As hydrocarbons are extracted from the reservoir over time, the stratification of fluid properties within the reservoir changes. For example, changes in the fluid pressure distribution due to extraction will in turn effect the hydrocarbon-permeability of the reservoir itself, according to Darcy's law. While classical governing equations combined with powerful analytical techniques can in some cases predict reservoir operating conditions with precision, it is often found that unpredictable and/or unknown parameters, such as the exact shape and extent of the reservoir, precludes an accurate analytical solution of reservoir operating conditions. These conditions would make even the solution of a steady-state problem more difficult. The operation of a hydrocarbon reservoir exhibits transient conditions over time as material extractions alter conditions of the hydrocarbons remaining in the reservoir, which exacerbates attempts to arrive at analytical solutions to such systems.

When the predictive accuracy of a reservoir model or simulation is found to be unacceptably deficient, engineers refine the existing models using a history matching technique which compares model predictions with measured operational data. Any necessary refinements to the model can be made by supplying corrected inputs to the simulation, as well as by interpolating trends observed in the field measurements. This history matching phase of a reservoir simulation's life cycle is typically demanding in terms of manpower and resources, as various data points obtained from all wells in the field must be collected and collated for later access by the engineers who undertake the labor-intensive project of adding the measured data to the simulation of the wells. Any data that is added to the simulation must be subjected to quality control checks, from the standpoint of the trustworthiness of the instrumentation used to gather the measurements, the accuracy of the update process being used, and the need to avoid sourcing or transcription errors. Naturally, any data-handling process which extends over a protracted time and involves human operators (engineers need to access data from potentially disparate sources, which extends the timeframe to complete the history matching process) is prone infusion of errors into what is intended to be a corrective process.

It is with respect to this background that the present disclosure is addressed.

SUMMARY OF THE DISCLOSURE

The present disclosure provides a method and system whereby a history matched reservoir simulation model can be rapidly updated with recently-obtained field measurements, thereby providing a means by which the reservoir simulation model can be kept current in its fidelity to reservoir conditions as they change over time. In an embodiment of the disclosure, the steps of the method detailed herein can be implemented as a plurality of processes running on at least one processor connected to at least one memory.

In accordance with a broad aspect and one embodiment of the disclosure, a computer-based method for updating a reservoir simulation model concerning a well is provided. The reservoir simulation model is hosted on an information technology system having at least one processor and a memory. The method comprises the steps of accessing at least one database comprised of at least one well update file. Each well update file comprises well update data to be added to a corresponding well model file of the reservoir simulation model. The well update files, in turn, comprise: a rate update file comprising updated data describing time-indexed and position-indexed production rates from the well; a completion update file comprising updated data describing a time-indexed and position-indexed degree of completion for the well; and a pressure update file comprising updated data describing time-indexed and position-indexed pressures measured during operation of the well. The method updates the well model files over a prescribed update period using a software module executing on the processor. The software module configures the processor to: parametrically vary the time over the prescribed update period and the position for each well model file and its corresponding well update file; compare the well model file and the well update file at each respective time and each respective position; insert well update file data in the well model file at each respective time and each respective position in which the well model file lacks data; and resolve conflicts between the well model file and the well update file at any given time and respective position in accordance with a conflict rule executing on the information technology system. The conflict rule preserves well model file data in the event of a conflict with well update file data and replaces well model file data with well update file data in the event of no conflict at any given time and respective position.

In an embodiment of a method in accordance with aspects of the disclosure, a history-matched reservoir simulation model is selected to undergo an update process from among a plurality of history-matched reservoir simulation models hosted on an information technology system. In specifying the parameters of the update process, a user successively specifies a petroleum field model, a reservoir model, and at least one well model to be updated. Each well model comprises a set of well model files containing historical data collected during operation of the reservoir, specifically, a rate model file comprising historical data describing time-indexed and position-indexed production rates from the well, a completion model file comprising historical data describing a time-indexed and position-indexed degree of completion for the well, and a pressure model file comprising historical data describing time-indexed and position-indexed pressures measured during operation of the well. The user can specify the specific well model files to be updated and the update period. In the absence of user selections, a default well model file selection rule and a default update period selection rule are implemented.

A database containing at least one update file is then accessed, wherein each well update file comprises well update data to be added to a corresponding well model file of the selected reservoir simulation model during an update operation. The well update files include a rate update file comprising updated data describing time-indexed and position-indexed production rates from the well, a completion update file comprising updated data describing a time-indexed and position-indexed degree of completion for the well, and a pressure update file comprising updated data describing time-indexed and position-indexed pressures measured during operation of the well. With access to the update data established, an update operation proceeds by parametrically varying the time over the selected update period and the position for each selected well model file and its corresponding well update file, during which process the well model file and the well update file are compared at each respective time and each respective position. Well update file data is inserted in the well model file at each respective time and each respective position wherein the well model file lacks data, while conflicts between the well model file and the well update file at each respective time and each respective position are resolved in accordance with a conflict rule. The conflict rule comprises the options of preserving well model file data in the event of a conflict with well update file data at each respective time and each respective position or replacing well model file data with well update file data in the event of a conflict at each respective time and each respective position. In cases where a conflict rule is not specified, a default conflict rule is implemented to govern the resolution of conflicts between the well model file and the well update file at each respective time and each respective position.

In an embodiment in accordance with the disclosure, the default well model file selection rule dictates performing an update of all three well model files. In an alternative embodiment, the default update period selection rule applicable to rate model files dictates a default update period beginning at a time corresponding to a most recent rate event and ending at a time at which the well update data was obtained, and wherein the default update period selection rule applicable to completion model files and pressure model files dictates an update period beginning at commencement of well production and ending at the time at which the well update data was obtained.

In an embodiment in accordance with the disclosure, the default conflict rule dictates replacing well model file data with well update file data in the event of a conflict at each respective time and each respective position.

In an embodiment in accordance with the disclosure, the method further comprises optionally specifying an output path for updated well model files, and wherein a non-specification implements a default output path rule governing the specification of output paths for writing the updated well model files.

In an embodiment in accordance with the disclosure, the method further comprises optionally specifying an output prefix for updated well model files, wherein a non-specification implements a default output prefix rule governing the specification of an output prefix to be applied to respective filenames of the respective updated well model files.

In an embodiment in accordance with the disclosure, the step of selecting a petroleum field to be updated further comprises optionally selecting a limited data access mode that reduces method execution time by limiting the fields accessed to only the selected field.

In an embodiment in accordance with the disclosure, a system comprised of software modules can be constructed that implements the disclosed method while running on at least one processor connected to at least one memory.

These and other features, aspects, and advantages can be appreciated from the following description of certain embodiments in accordance with the present disclosure.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

The present disclosure concerns a method and system that can be used to perform rapid updates of a reservoir simulation model by accessing an enterprise database in regard to prescribed specifications of parameters to be updated, such as may be provided programmatically or by a user. In part, the system and method of the present disclosure provide intelligent collation and management of vast amounts of data that have been designated according to different categories or descriptions and which need to be configured for use as inputs by the reservoir simulation. The system and method connect to a corporate database to extract all necessary data and generate consistent inputs, including rates, pressures and well completions data is developed. Such data is incorporated into existing simulation model data input. In part, systems and methods consistent with the present disclosure provide and utilize rules as to how different categories of data are to be treated, and enforce those rules by guarding trusted data from being overwritten, while also allowing the automated replacement of newly-measured and certified data into the reservoir simulation's inputs to supplant legacy data collected with less accuracy or which is otherwise outdated.

The present disclosure concerns the whole procedure of processing data to run a reservoir simulation model for history matching up to current date, such as wells name, wells trajectory, wells event details, pressure data and production/injection data. These are all requirement to run conventional reservoir simulation models using conventional simulation tools. The main responsibility of the system 300 (discussed below) is to update the well perforation file data. The system loads a given simulation case including the grid geometry and static properties, UTM well definitions from, say, ASCII files, and uses this information to construct well trajectories and their completions. On the other side:, the output of the system is to export the simulation data for both the grid and wells to a format readable by the simulation model. The output file an identify grid cells and their corresponding values suitable for the calculation of the recovery factor for each grid cell.

Figure 1:
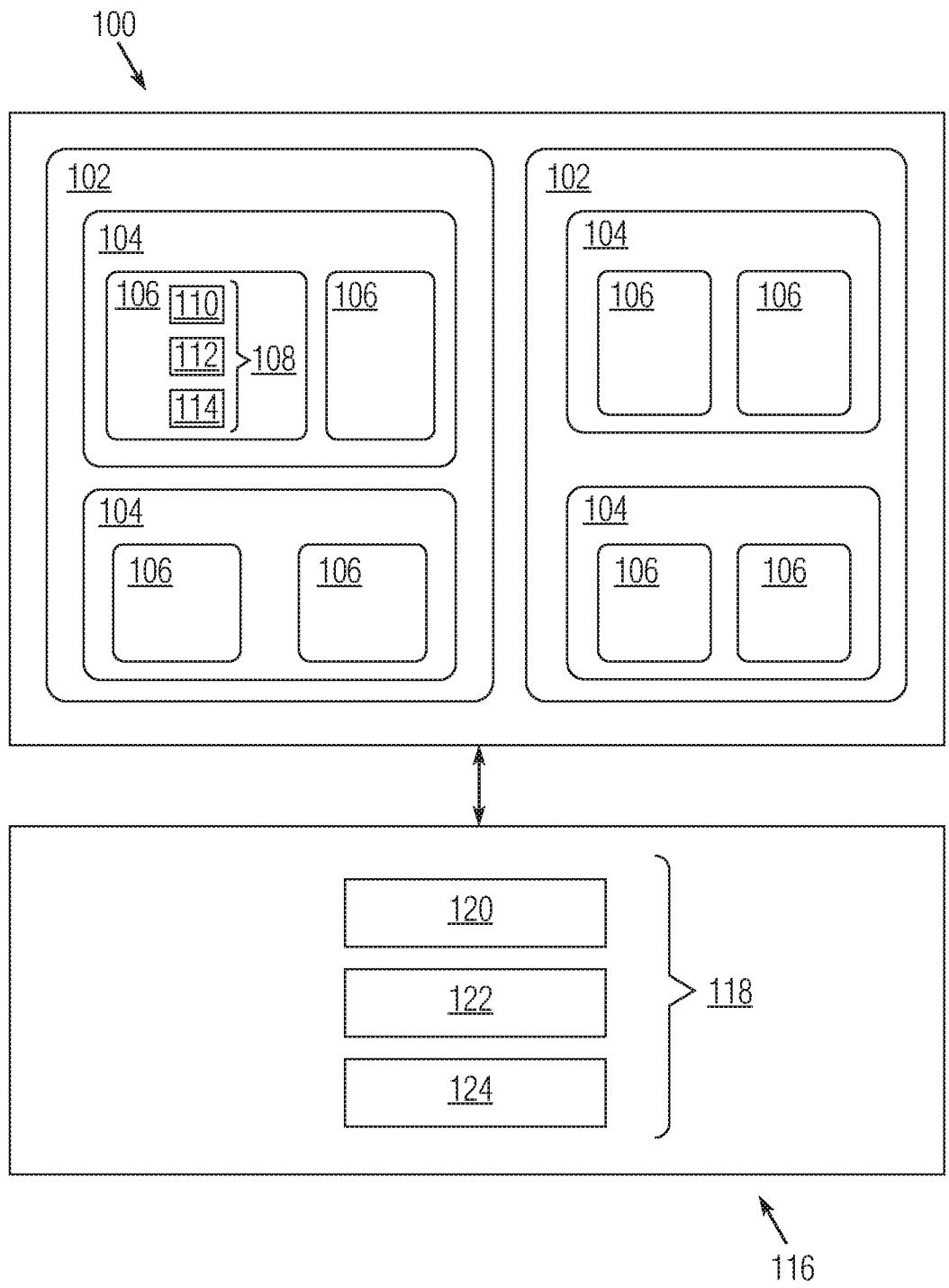
FIG. 1 illustrates a schematic representation of an exemplary reservoir simulation model and a database containing reservoir simulation model update data, both of which reside on an enterprise information technology system.

FIG. 1 shows a schematic representation of an exemplary reservoir simulation model 100 that is hosted on an enterprise information technology system of the type having at least one processor and a memory which stores code accessible to the processor to enable the model 100 to be run. The model comprises at least one field model 102 of the type which can be a source for petroleum extraction. In FIG. 1, two field models are schematically illustrated, but a multiplicity of such field models 102 can be utilized in connection with a given reservoir simulation model 100.

Reflecting their real-world counterparts, the field model 102 is generally comprised of a plurality of reservoir models 104 because a given field will have plural reservoirs. Likewise, each reservoir model 104 typically has a plurality of well models 106, simulating the individual wells disposed within a given reservoir to effect extraction operations. In FIG. 1, these models are illustrated as being nested, though each one in practice is implemented in a hardware processor executing code either serially or in parallel. The nesting is a visual aid and is not intended to be limiting of the disclosure.

With this background in mind, each well model 106 is the fundamental unit of the reservoir simulation model 100, which, as noted can be constructed to include multiple field, reservoir and well models. Each well model 106 is characterized by operational conditions over time which include, without limitation, extraction rates, degree of completion, and pressures. Such well models are conventional and form no part of the present invention.

Data describing the operational conditions for each well model 106 are captured in a set of well model files 108, which comprise respective rate model files 110, completion model files 112, and pressure model files 114, as shown for an exemplary well model 106 in FIG. 1. The update process in accordance with the present disclosure can pick one or more of these targets for updating. Each rate model file 110 comprises historical data describing time-indexed and position-indexed production rates from the well. For instance, rate files include oil recovery rates (Qo), water recovery rates (Qw), gas recovery rates (Qg), water injection rates (Qwi), and gas injection rates (Qgi) for both injectors and producers. Each completion model file 112 comprises historical data describing a time-indexed and position-indexed degree of completion for the well. Each pressure model file 114 comprises historical data describing time-indexed and position-indexed pressures measured during operation of the well. Collectively, the data in these files are sufficient to enable the reservoir simulation model 100 to be implemented and provide simulation data on the production of the reservoir. On the other hand, the model 100 and the files that drive the model benefit from the presently disclosed rapid update process to keep the model accurate as continued extraction operations change the conditions within the reservoir.

FIG. 1 also shows a database 116 that is hosted on the information technology system. The database 116 is accessible by the reservoir simulation model update module. The database 116 comprises at least one well update file 118, each well update file comprising well update data to be added to a corresponding well model file 108 of the selected reservoir simulation model 100 during an update process. The well update files 118 comprise a rate update file 120, a completion update file 122, and a pressure update file 124. Each rate update file 120 for a given well comprises updated data describing time-indexed and position-indexed production rates from the well. Each completion update file 122 comprises updated data describing a time-indexed and position-indexed degree of completion for the well, and each pressure update file 124 comprises updated data describing time-indexed and position-indexed pressures measured during operation of the well. In other words, as will be appreciated, there is an update file corresponding to each respective rate model file 110, completion model file 112, and pressure model file 114. As described below, in part, the present disclosure provides a system and method for guarding trusted data from being overwritten while also allowing the placement of newly-measured and certified data into the reservoir simulation's inputs, and, as such, the system coordinates the transfer of updated data from each rate update file 120, completion update file 122, and pressure update file 124.

Figure 2:
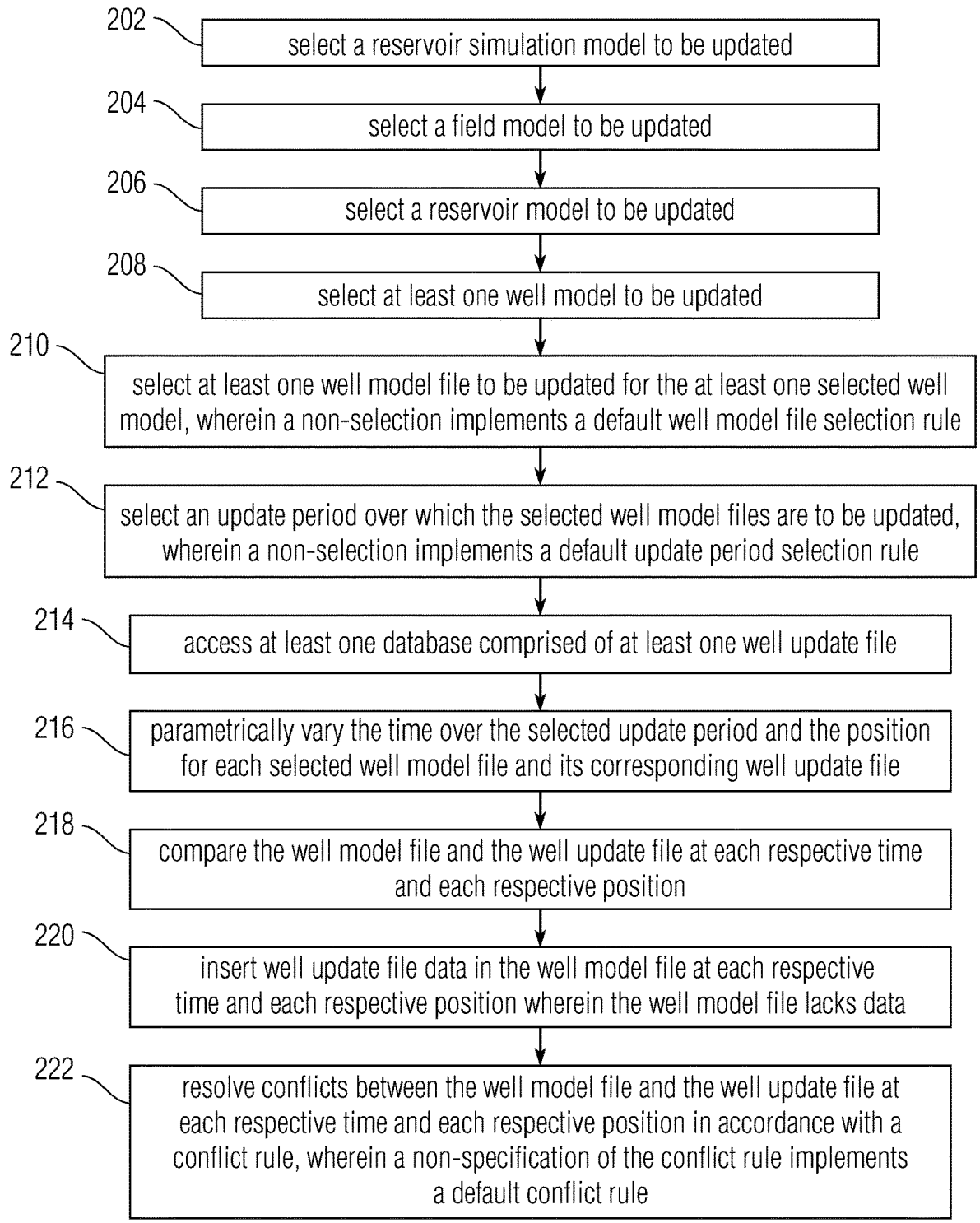
FIG. 2 outlines one exemplary method according to the present disclosure.

One embodiment of a computer-based method 200 by which a reservoir simulation model is updated is shown schematically in FIG. 2. Other methods can be performed which employ the salient steps to provide for automated updates to an overall simulation model while guarding trusted data from being overwritten.

In regard to the method of FIG. 2, the collective experience of multiple oil companies over years has led to the development of a vast array of reservoir simulation models, some of which have been made commercially available to other companies in the industry, while others are strictly proprietary, reflecting both the unique characteristics of a company-operated reservoir and emphasizing the operational parameters considered to be most important to that specific enterprise. An enterprise information technology system can host multiple reservoir simulation models, as the choice of which model is most appropriate to use in a specific instance can be made on a case-by-case basis. Some models are known to better account for unique geological characteristics of a well, while others have been found to make accurate predictions of well production over a larger time span of a well's service life. As noted, the particular models to be used in a given application form no part of the present disclosure. Rather, the technical problem addressed by this disclosure concerns the update process to better ensure that simulations are implemented using the most accurate underlying data available.

Thus, the first step 202 of the disclosed update process is selecting at least one of the hosted reservoir simulation models 100 to undergo an update process. As noted, the reservoir simulation model 100 comprises at least one field model 102, and each field model 102 in turn comprises at least one reservoir model 104. Each reservoir model comprises at least one well model 106, and each well model 106 is comprised of a set of well model files 108 which comprise respective rate model files 110, completion model files 112, and pressure model files 114. The rate model files 110 comprise historical data describing time-indexed and position-indexed production rates from the well, while the completion model files 112 comprise historical data describing a time-indexed and position-indexed degree of completion for the well, and the pressure model files 114 comprise historical data describing time-indexed and position-indexed pressures measured during operation of the well.

Having selected a reservoir simulation model 100 from the set of reservoir simulations hosted on the subject information technology system, the next step 204 of the method shown in FIG. 2 is selecting a field model 102 to be updated for the selected reservoir simulation model 100. Petroleum exploration enterprises typically have petroleum fields scattered across significant swaths of territory, with consequent variance in the local conditions encountered at each of these fields. Furthermore, different petroleum fields are often at different stages of their service lives, a factor which also dictates the need for custom, history-matched reservoir simulation models to be used to make predictions of a reservoir's performance. An interface can present choices of field models for updating and can cycle through selected or prescribed fields to update the data used in any given simulation.

With the field model 102 to be updated selected in step 204, a user then selects a reservoir model 104 to be updated in step 206 of the disclosed process. Production from real-world reservoirs is accomplished by using at least one, and usually many, wells set within the reservoir to extract the crude oil. By the same token, each reservoir model 104 is comprised of at least one, but usually many, well models 106. The method of FIG. 2 allows a user to select one or more well models to be updated in step 208 at the same time, and the user has the option in the next step 210 to perform a comprehensive update of the selected well models 106, updating all three well model files 108 for each selected well model 106, or to specify the well model files 108 that are to be updated. A non-selection of well model files 108 that are to be updated implements a default well model file selection rule governing the selection of the respective well model files that are to be updated. The desired update period over which the selected well model files 108 are to be updated can be selected in step 212 of the process, and a non-selection implements a default update period selection rule governing the update period over which the respective well model files are updated. In one implementation, the update can be since the user's last rate update event.

After the user selections described above have been made, step 214 of the method of FIG. 2 involves accessing at least one database 116 comprised of at least one well update file 118, wherein each well update file comprises well update data to be added to a corresponding well model file 108 of the selected reservoir simulation model 100 during an update operation. The well update files 118 comprise a rate update file 120, a completion update file 122, and a pressure update file 124, arranged to contain data as described above.

Using the database 116, the applicable (e.g., selected or prescribed) well model files 108 are updated by parametrically varying the time over the selected update period and the position for each selected well model file 108 and its corresponding well update file 118. In other words, a family of data is generated by varying these constants in other equations of the same general form, as described next. This provides a step-by-step cycling through the respective well model files 108 and well update files 118 over time and position to provide a basis for gathering insight into the information in the well model files, such as discrepancies, gaps in data, and other bases for potentially updating the well model file 108, as described next.

At step 218, the well model file 108 and the well update file 118 are compared at each respective time and each respective position. In cases where the well model file 108 is found to lack data corresponding to the same point in the well update file 118 (that is, at the same point in time or location), the data from the well update file 118 is inserted into the well model file 108 at that point, filling the gap in the well model file 108, as indicated at step 220.

On the other hand, when data is present at the same respective time point or respective position point in both the well model file 108 and the well update file 118, but the values conflict, data from the well update file 118 is not automatically inserted into the well model file 108 until the conflict is resolved in accordance with a conflict rule utilized in step 222. In one implementation of the method, the terms of the conflict rule are chosen to dictate that the well model file data be preserved in the event of a conflict with well update file data at each respective time and each respective position. In such implementations, an exception report can be generated for operator review. In a different implementation, the terms of the conflict rule are configured and dictate that the well model file data be replaced with well update file data from the database in the event of a conflict at each respective time and corresponding position.

In the absence of a user-specified or prescribed conflict rule, in certain implementations, a default conflict rule is implemented governing the resolution of conflicts between the well model file and the well update file at each respective time and respective position.

No matter which option for the conflict rule is in effect, whether chosen by a user, prescribed or implemented by default, the result of the method illustrated in FIG. 2 is that the reservoir simulation model is updated automatically, with gaps in historical data filled in the well model files 108 and outdated data within these same files replaced with more recent data sourced from the well update files 118.

It will be appreciated from the foregoing that the steps of parametrically varying over time the update period and the position for each well model file under review and its corresponding well update file includes processing of the respective rate model file 110 and rate model update file 120, completion model file 112 and completion model update file 122, and pressure model file 114 and pressure model update file 124.

A complete method can be implemented in accordance with a further aspect of the present disclosure by performing steps 214 through 222 using prescribed reservoir simulation models, wells, and data sets. The selections referred to in connection with the discussion of steps 202 through 212 of FIG. 2 can be done programmatically in such embodiments, using code executing in the information technology system, as described further below. As such, no user selections are needed in accordance with this embodiment. Instead, one or more hosted reservoir simulation models 100, field models 102, reservoir models 104, and well models 106 are updated in accordance with rule-based criteria that can be prescribed and stored in a memory for use by the processor in implementing an update to the reservoir simulation model(s).

As noted in regard to steps 214 through 222, the methods described herein can be configured to incorporate default rules for use in situations in which a user does not select, specify, or otherwise define any or all of the input parameters. For example, when a user elects to perform an update of the reservoir simulation model but does not specify which well model files to update, or in certain embodiments in which the system 100 implements a default well model file selection rule in which an update is performed of all three well model files 108. In another instance, when a user elects to perform an update operation but does not specify an update period, a default update period selection rule applicable to well model files is implemented. In an embodiment, the default update period selection rule can be specified in terms of the type of well model file being updated. For example, the default update period selection rule can be specified for a rate file to dictate a default update period beginning at a time corresponding to a most recent rate event and ending at a time at which the well update data was obtained, whereas the default update period selection rule applicable to completion model files and pressure model files can be specified to dictate an update period beginning at commencement of well production and ending at the time at which the well update data was obtained.

The inventors contemplate that machine-based determinations can be made to select locations and time periods in regard to information from the database 116 which indicates, among other things, one or more of the following: (i) where there is the newest or highly-trusted data for use in the update assessment; (ii) the fields corresponding to the field wells where there has been much extraction and therefore more chance for a need to update the simulation; (iii) the reservoirs corresponding to the reservoir models where there has been much extraction and therefore more chance for a need to update the simulation; and the wells corresponding to the well models where there has been much extraction and therefore more chance for a need to update the simulation. In each case above, the determination as to whether there has been "much extraction" can be where extraction has exceeded a threshold volume of oil. Once the simulation model update is needed based on the above criteria for machine-based determinations, a user can initiate an update to the model thorough the user interface, in certain embodiments, seamlessly, with just one approval click to proceed with the update. During the request process for a possible update, a default setting can be set, and an update process can proceed without any further user involvement on the basis of the default setting and the criteria for the machine-based determinations as to when an update is needed. On the other hand, in the case of a system being configured to not initiate an update based on a default setting, the user has the option to input through the interface, such as via a check box or radio button, the corresponding selections that the user wishes to make with respect to any particular model, field, time period, well, and any more specific parameters (e.g., rate, perforations, pressure) and how to address any conflicts with existing data during the update process, as discussed herein.

In one or more embodiments, the resolution of conflicts is configured by code executing in a processor to resolve conflicts in accordance with one or more default rules, meaning that a default conflict rule can be set to dictate how data conflicts are resolved. In an embodiment, the default conflict rule replaces well model file data with well update file data in the event of a conflict at each respective time and each respective position. In other embodiments, more nuanced conflict resolutions can be implemented under control of a conflict rule set implemented by a conflict resolution module programmed accordingly.

A default conflict rule can be configured to retain existing values from existing model files 108 in the event that the existing data does not match all or a portion of the content of the extracted update files 118, for instance, within a prescribed range of values. Such a default conflict rule retains the original model file data intact since it has been quality checked by the user and validated or modified in such way that fits the user's purposes of differentiating some available data. Changes to the data can be excluded under this rule, for instance, when the changes in the values are outside the prescribed ranges which might be called into question if sufficient time or oil extraction has not occurred since the last data update. On the other hand, the user can modify the conflict rules before starting a particular data update process.

In one implementation, an existing well will have multiple entries to a reservoir history. An engineer might choose to split the data for that well, for multiple wells having that fact pattern, or for a selection of such wells, where old rates represent old reservoir entry and new extracted data represent the new well section.

Another frequent example of handling conflicts in the data is to update well perforations. Most of the time, an engineer manually modifies the perforations of some wells by extending them to a certain measured depth. Certain wells can be marked to be excluded during the update process.

Changing conflict rules can be implemented simply by selecting or deselecting wells using a check box provided in the user interface. Users can change conflict rules to not retain original values and to instead replace the existing data with the updated data from files 118. In terms of determining the update coverage, a default set up can be to start from last available data in the rate files. Users can modify the update process through the interface to start from a specific date to meet the current objective.

One or more methods consistent with the present disclosure provide options for writing the updated well model files. In an embodiment, an output path is specified for writing the updated well model files to a destination on the information technology system. In one implementation, the updated well model files are written to the same path name as the pre-update well model files on a copied model (that is, so as to not overwrite the original model) to ensure not to interrupt or corrupt the original model files. Further options regarding writing of the output files include specifying an output prefix for updated well model files in which a default output prefix rule governs the specification of an output prefix to be applied to respective filenames of the respective updated well model files.

When the update process is complete, the system and method described herein replaces the data files for the well model with the updated data, in accordance with the applicable conflict rules, so that the model is ready to be submitted to the reservoir simulation system 100.

A further aspect of the present disclosure concerns techniques to reduce the time of execution of the method. This feature can be provided, in certain embodiments, as an augmentation of step 204 of the method shown in FIG. 2. In embodiments that have this feature, a limited data access mode can be invoked which reduces method execution time by limiting the fields accessed to only certain fields, such as fields selected by a user or by a simulation management module (which can be part of the simulation model update module 308), discussed below. In this manner, superfluous loading of large caches of data is avoided, thus further streamlining the methods practiced in accordance with the present disclosure.

Figure 3:
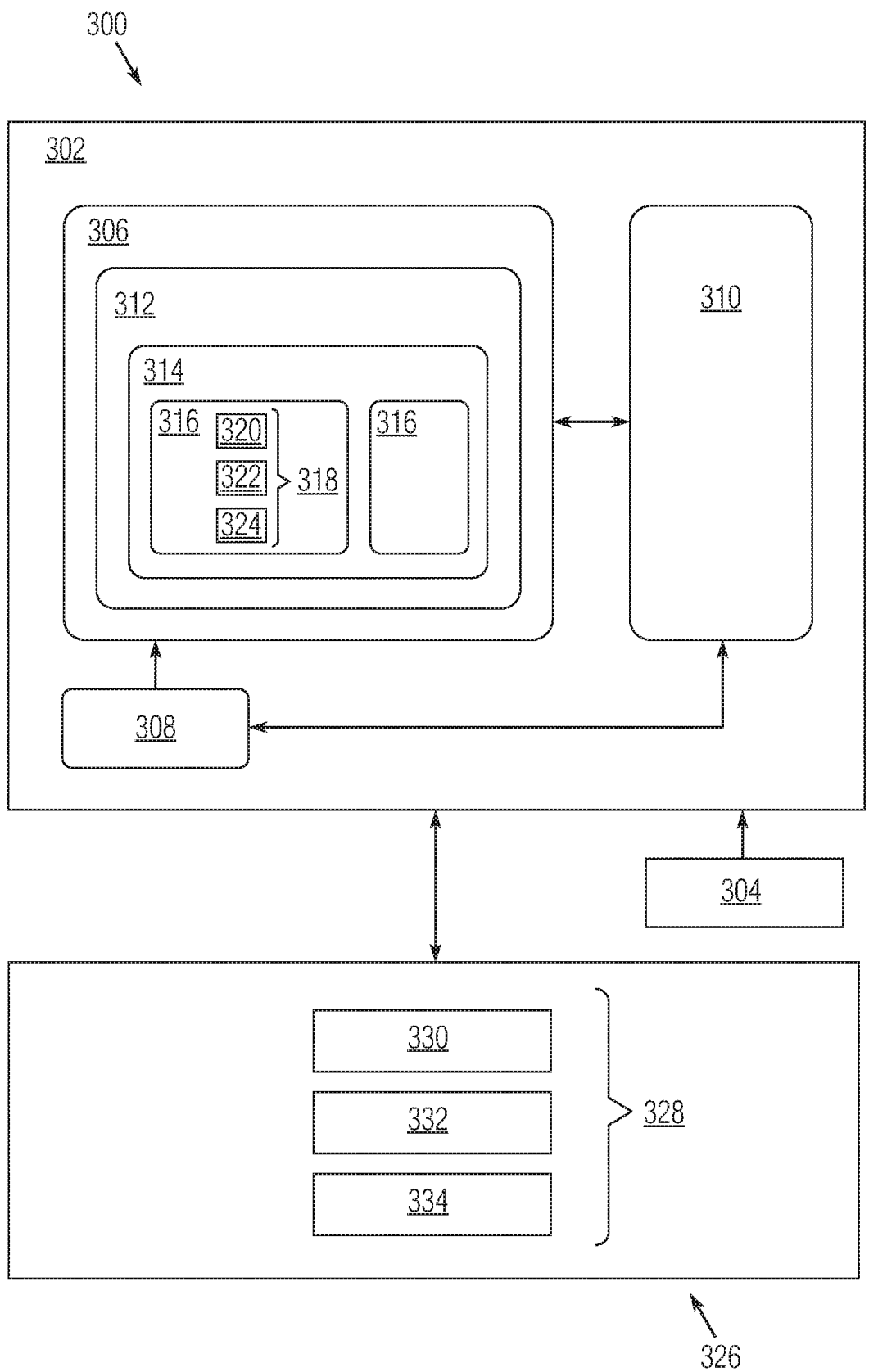
FIG. 3 illustrates a schematic representation of a system according to the present disclosure.

The present disclosure also provides a computer-based system 300 for rapidly updating a history-matched reservoir simulation model selected from among a plurality of history matched reservoir simulation models hosted on an information technology system, the system shown schematically in FIG. 3. The system comprises at least one processor 302 connected to at least one memory 304, and it includes at least one reservoir simulation model comprising code 306 and at least one reservoir simulation model update module 308, also comprising code, running on the at least one processor. The reservoir simulation model update module 308 is configured to act on selections and specification made by the system to satisfy prescribed criteria, or by a user, such as would result from selections and specifications from at least one user interface process 310 running on the at least one processor.

In one or more implementations consistent with the disclosure, preset rules from a given oil company are applied to update the simulation models periodically, e.g., every week, with regard to certain data fields, such as, by way of example and not limitation, the rate production and pressure of the wells in a particular simulation model for all reservoirs governed by that model. With regard to already drilled wills, whenever they are declared complete and turned on for production, an update to simulation model can be triggered automatically in certain implementations of the present disclosure, with the data of the well being read from the database and the simulation model being updated without user intervention. In this case, the result of the new update is sent to the reservoir simulation engineer who is responsible for that field to verify and accept this addition. This will either assure reservoir simulation engineers that their existing simulation models prediction is accurate so that they are comfortable in relying upon them for future plans, or otherwise, if the data updated to the model shows a deviation from the predicted behavior by the model. In that latter case, the system releases a flag to the engineers and decision makers that the simulation model needs to be updated to more closely match the history of the model in order to be confidant that it will continue to provide accurate predictions. Further, the accumulation of deviations from the current period for a continuing period of time, such as one set by the engineers to review (e.g., one year) can be a basis to trigger an automated decision for a mandatory update to the model. Likewise, the determination that there has been an accumulation of deviations can be provided in an alert (e.g., a digital notification) to help decision makers to prioritize and select which among their fields and reservoirs has the least accurate prediction so that the engineers can take action to update the models most in need of an update. After each update to the history data (rate, pressure, new wells) into the model, a report can be generated in certain embodiments to give the percentage of history matching (HM) after the update and before the update and whether the simulation model continues to provide a confidence in matching the history of the wells, and reservoirs and fields.

The reservoir simulation model update module 308 is configured to apply the user selections and specifications, as well as default and programmatic rules in the absence of a user selection or specification, to perform an update operation on a selected reservoir simulation model 306. The interface module 310 is configured to prompt and receive a user selection of a reservoir simulation model 306, or to otherwise respond to a programmatic identification of a reservoir simulation model to be updated from at least one reservoir simulation model hosted on the information technology system. Each reservoir simulation model 306 comprises at least one field model 312, wherein each field model comprises at least one reservoir model 314, and further wherein each reservoir model comprises at least one well model 316. Each well model in turn comprises a set of three well model files 318, namely, a rate model file 320 comprising historical data describing time-indexed and position-indexed production rates from the well, a completion model file 322 comprising historical data describing a time-indexed and position-indexed degree of completion for the well, and a pressure model file 324 comprising historical data describing time-indexed and position-indexed pressures measured during operation of the well.

The interface module 310 is further configured to either prompt and receive successive user selections of a field model 312, reservoir model 314, and at least one well model 316 to be updated, or to act on selections made by the simulation management module (e.g., a part of the simulation model update module 308). The interface module is also configured to prompt and receive user selections indicating the specific well model files 318 to be updated, as well as the time interval over which they should be updated, or to otherwise act on selections made by the simulation management module, as just described. Non-selections by the user result in default rules being applied in both cases, including in cases in which the simulation management module is making programmatic determinations as to which reservoir simulation models are to be updated, for which time periods, and which locations.

FIG. 3 also shows a schematic view of a database 326, hosted on the subject information technology system, that is accessible by the reservoir simulation model update module 308. The database 326 is comprised of at least one well update file 328, wherein each well update file 328 comprises well update data to be added to a corresponding well model file 318 of the selected reservoir simulation model 306. The well update files 328 comprise a rate update file 330 comprising updated data describing time-indexed and position-indexed production rates from the well, a completion update file 332 comprising updated data describing a time-indexed and position-indexed degree of completion for the well, and a pressure update file 334 comprising updated data describing time-indexed and position-indexed pressures measured during operation of the well. These files are populated with recently-measured data that is more reflective of current reservoir operating conditions than the historical data that was used in the initial build of the reservoir simulation model 306. Hence, when this data contained in the well update files 328 is used in an update operation, the reservoir simulation model 306 will be better able to make accurate predictions of reservoir performance.

With access to the database 326, the disclosed system is ready to perform an update operation. The reservoir simulation model update module 308 is further configured to perform the update operation on the selected well model files 318 of the selected reservoir simulation model 306 over the selected update period by first parametrically varying the time over the selected update period and the position for each selected well model file 318 and its corresponding well update file 328, as described above. Again, this step-by-step cycling through the respective well model files 318 and well update files 328 over time and position enables the reservoir simulation model update process 308 to compare the well model file and the well update file at each respective time and each respective position to provide a basis for gathering insight into the information in the well model files. In cases where the well model file 318 is found to lack data corresponding to the same point in the well update file 328 (that is, at the same point in time or location), the data from the well update file 328 is inserted into the well model file 318 at that point, filling the gap in the well model file 318. On the other hand, when data is present at the same respective time point or respective position point in both the well model file 318 and the well update file 328, but the values conflict, data from the well update file 118 is not automatically inserted into the well model file 108 until the conflict is resolved in accordance with a conflict rule encoded in the reservoir simulation model update module 308, as described above.

In an embodiment of a system according to the present disclosure, conflict rules can be established or selected by a user, as described above, or resolved programmatically using default rules, also as described above. No matter which option for the conflict rule is in effect, whether chosen by a user or implemented by default, the result of an update process implemented by the system illustrated in FIG. 3 is that the reservoir simulation model 306 has been updated in an automated fashion, with gaps in historical data filled in the well model files 318 and outdated data within these same files replaced with more recent data sourced from the well update files 328. The disclosed system can be encoded with default rules for use in instances in which a user does not select or specify input parameters. For example, when a user elects to perform an update of the reservoir simulation model but does not select or specify which well model files to update. As another example, the system 100 implements a default well model file selection rule in which an update is performed of all three well model files 108. In either case, a default well model file selection rule is implemented, which according to an embodiment dictates performing an update of all three well model files 318. In another instance, when a user elects to perform an update operation but does not specify an update period, a default update period selection rule applicable to well model files is implemented. In an embodiment, the default update period selection rule can be specified in terms of the type of well model file being updated. For example, the default update period selection rule can be specified for a rate file to dictate a default update period beginning at a time corresponding to a most recent rate event and ending at a time at which the well update data was obtained, whereas the default update period selection rule applicable to completion model files and pressure model files can be specified to dictate an update period beginning at commencement of well production and ending at the time at which the well update data was obtained.

The resolution of conflicts can also be programmed by default, meaning that a default conflict rule can be encoded in the reservoir simulation model update process 308 to dictate how data conflicts are resolved. In an embodiment, the default conflict rule can be encoded to dictate replacing well model file data with well update file data in the event of a conflict at each respective time and each respective position.

The invention encompassed by the present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A computer-based method for updating a reservoir simulation model concerning a well, the reservoir simulation model being hosted on an information technology system having at least one processor and a memory, the method comprising:

receiving, via a graphical user interface provided by at least one processor, at least one selection respectively representing at least one of a model, a time period, a well production rate, well perforation, and well pressure;

accessing at least one database comprised of information representing:

a time-indexed well production rate and a position-indexed well production rate respectively associated with at least one well model file used by the reservoir simulation model concerning the well;

a time-indexed degree of well completion and a position-indexed degree of well completion respectively associated with at least one model file used by the reservoir simulation model concerning the well; and a time-indexed pressure and a position-indexed pressure, measured during well operation, and respectively associated with at least one well model file used by the reservoir simulation model concerning the well;

automatically matching at least some of the information in the at least one database with the at least one selection received via the graphical user interface and extracting at least some of the matched information from the at least one database;

identifying a plurality of well model files associated with the reservoir simulation model, and respective prescribed data update periods and positions for the well model files;

automatically cycling through the well model files and the extracted information to identify data discrepancies or data gaps between at least one of the plurality of well model files and the extracted information;

varying, based on the identified data discrepancies or data gaps, the prescribed update period or the position for at least one of the well model files;

for each of the at least one of the well model files, in accordance with the respective varied update period or the varied position:

in the event of a conflict between the well model file and at least some of the extracted information at any given time and respective position:

making a copy of the reservoir simulation model and replacing at least some well model file data in the copy of the reservoir simulation model with at least some of the extracted information; and in the event of no conflict between the well model file at any varied time and respective position and at least some of the extracted information:

replacing the at least some well model file data with at least some of the extracted information.

2. The method as in claim 1, wherein at least one conflict rule executing on the information technology system comprises a default well model file selection rule mandating an update of three well model files.

3. The method as in claim 2, wherein a default update period selection rule applicable to rate model files dictates a default update period beginning at a time corresponding to a most recent rate event and ending at a time at which well update data was obtained, and wherein the default update period selection rule applicable to completion model files and pressure model files dictates an update period beginning at commencement of well production and ending at the time at which the well update data was obtained.

4. The method as in claim 2, wherein a default conflict rule dictates replacing well model file data with well update data from the extracted information in the event of a conflict at each respective time and each respective position.

5. The method as in claim 1, further comprising:

selecting a petroleum field to be updated by selecting a limited data access mode that reduces method execution time by limiting the fields accessed to only the selected petroleum field.

6. A computer-based method for rapidly updating a history matched reservoir simulation model selected from among a plurality of history matched reservoir simulation models hosted on an information technology system having at least one processor and a memory, the method comprising:

selecting a reservoir simulation model hosted on the information technology system, the reservoir simulation model comprising:

at least one field model, wherein each field model comprises at least one reservoir model, and further wherein each reservoir model comprises at least one well model, wherein each well model comprises:

a rate model file comprising historical data describing time-indexed and position-indexed production rates from a well;

a completion model file comprising historical data describing a time-indexed and position-indexed degree of completion for the well; and a pressure model file comprising historical data describing time-indexed and position-indexed pressures measured during operation of the well;

receiving, via a graphical user interface provided by at least one processor, at least one selection respectively representing at least one of a model, a time period, a well production rate, a well perforation, well pressure, and handling a data conflict;

selecting, by processing the at least one selection, a field model-a reservoir model at least one well model, and at least one well model file, wherein a non-selection of a well model file implements a default well model file selection rule governing a selection of at least one respective well model file;

identifying an update period over which the at least one well model file is be updated, wherein a non-selection regarding an update period implements a default update period selection rule governing the update period over which a respective at least one well model file is updated;

accessing at least one database comprised of information representing:

time-indexed and position-indexed production rates from the well;

time-indexed and position-indexed degree of completion for the well; and indexed and position-indexed pressures measured during operation of the well;

automatically extracting at least some of the information accessed in the at least one database by matching the information in at least one database with the at least one selection received via the graphical user interface;

cycling through the plurality of well model files and the extracted information to identify data discrepancies or data gaps between at least one of the plurality of well model files and the extracted information;

varying, based on the identified data discrepancies or data gaps, the selected update period or the position for at least one of the plurality of well model files;

for each of the at least one of the well model files, in accordance with the respective varied update period or the varied position, insert data from the extracted information at each varied time and position; and resolve conflicts between the well model file and at least some of the extracted information well update file at each respective time and each respective position in accordance with a conflict rule, wherein the conflict rule comprises the following options:

in the event of a conflict with the extracted information at any respective time and respective position, make a copy of the reservoir simulation model and replace at least some well model file data in the copy of the reservoir simulation model with at least some of the extracted information; or in the event of no conflict at each respective time and each respective position, replace at least some well model file data with at least some of the well update file data.

7. The method as in claim 6, wherein a non-specification of the conflict rule implements a default conflict rule governing the resolution of conflicts between the well model file and the well update file at each respective time and each respective position.

8. The method as in claim 6, wherein the default update period selection rule applicable to rate model files dictates a default update period beginning at a time corresponding to a most recent rate event and ending at a time at which well update data was obtained, and wherein the default update period selection rule applicable to completion model files and pressure model files dictates an update period beginning at commencement of well production and ending at the time at which the well update data was obtained.

9. The method as in claim 6, wherein the default conflict rule dictates replacing well model file data with well update file data in the event of a conflict at each respective time and each respective position.

10. The method as in claim 6, further comprising specifying an output path for updated well model files, and wherein a non-specification implements a default output path rule governing the specification of output paths for writing the updated well model files.

11. The method as in claim 6, further comprising specifying an output prefix for updated well model files, wherein a non-specification implements a default output prefix rule governing the specification of an output prefix to be applied to respective filenames of the respective updated well model files.

12. The method as in claim 6, wherein the step of selecting a petroleum field to be updated further comprises selecting a limited data access mode that reduces method execution time by limiting the fields accessed to only the selected field.

13. A computer-based system for rapidly updating a history matched reservoir simulation model selected from among a plurality of history matched reservoir simulation models hosted on an information technology system, the system comprising:
  at least one processor connected to at least one memory;
  at least one reservoir simulation model update process running on the at least one processor, wherein the reservoir simulation model update process is configured to receive user selections and specifications from at least one user interface process running on the at least one processor, and wherein the reservoir simulation model update process is configured to apply the user selections and specifications, as well as default rules in the absence of a user selection or specification, to perform an update operation on a selected reservoir simulation model, and wherein the user interface process is configured to:
    prompt and receive a user selection of a reservoir simulation model to be updated from at least one reservoir simulation model hosted on the information technology system, each reservoir simulation model comprising:
      at least one field model, wherein each field model comprises at least one reservoir model, and further wherein each reservoir model comprises at least one well model,
      wherein each well model comprises the following well model files:
        a rate model file comprising historical data describing time-indexed and position-indexed production rates from the well;
        a completion model file comprising historical data describing a time-indexed and position-indexed degree of completion for the well; and
        a pressure model file comprising historical data describing time-indexed and position-indexed pressures measured during operation of the well;
    prompt and receive a user selection of a field model to be updated for the selected reservoir simulation model;
    prompt and receive a user selection of a reservoir model to be updated for the selected reservoir simulation model;
    prompt and receive a user selection of at least one well model to be updated for the selected reservoir simulation model;
    prompt and receive a user selection of at least one well model file to be updated for the at least one selected well model, wherein a non-selection implements a default well model file selection rule governing the selection of the respective well model files that are to be updated;
    prompt and receive a user selection of an update period over which the selected well model files are to be updated, wherein a non-selection implements a default update period selection rule governing the update period over which the respective well model files are updated;
  at least one database hosted on the information technology system and accessible by the reservoir simulation model update process, the database comprised well update data to be added to a corresponding well model file of the selected reservoir simulation model in the form of well model update files, the well model update files comprising:
    a rate update file comprising updated data describing time-indexed and position-indexed production rates from the well;
    a completion update file comprising updated data describing a time-indexed and position-indexed degree of completion for the well; and
    a pressure update file comprising updated data describing time-indexed and position-indexed pressures measured during operation of the well;
  the reservoir simulation model update process further configured to perform the update operation on the selected well model files of the selected reservoir simulation model over the selected update period by:
    automatically extracting at least some of the information accessed in the at least one database by matching information in the at least one database with the at least one selection received via the graphical user interface and providing the extracted information in well model update files;
    cycling through the plurality of well model files and the well model update files to identify data discrepancies or data gaps between at least one of the plurality of well model files and the well model update files;
    varying, based on the data discrepancies or data gaps, the time over the selected update period and the position for each selected well model file
    comparing each well model file and well model update file in accordance with each respective varied time and each respective varied position;
    inserting, where the well model file lacks data and in accordance with each varied time and each respective varied position, well model update file data in a respective well model file;
    resolving conflicts, in accordance with each varied time and each respective varied position, between a respective well model file and a respective well model update file, in accordance with a conflict rule, wherein the conflict rule comprises the following options:
  in the event of a conflict with well model update file data at any respective time and respective position, making a copy of the reservoir simulation model and replacing at least some well model file data in the copy of the reservoir simulation model with at least some of the extracted information; or
  in the event of no conflict, replacing at least some well model file data with at least some of the well model update file data at each respective time and each respective position.

14. The system as in claim 13, wherein a non-specification of the conflict rule implements a default conflict rule governing resolution of conflicts between the well model file and the well model update file at each respective time and each respective position.

15. The system as in claim 13, wherein the default update period selection rule applicable to rate model files dictates a default update period beginning at a time corresponding to a most recent rate event and ending at a time at which the well update data was obtained, and wherein the default update period selection rule applicable to completion model files and pressure model files dictates an update period beginning at commencement of well production and ending at the time at which the well update data was obtained.

16. The system as in claim 13, wherein the default conflict rule dictates replacing well model file data with well model update file data in the event of a conflict at each respective time and each respective position.

17. The system as in claim 13, further comprising specifying an output path for updated well model files, and wherein a non-specification implements a default output path rule governing the specification of output paths for writing the updated well model files.

18. The system as in claim 13, further comprising specifying an output prefix for updated well model files, wherein a non-specification implements a default output prefix rule governing the specification of an output prefix to be applied to respective filenames of the respective updated well model files.

19. The system as in claim 13, wherein the step of selecting a petroleum field to be updated further comprises selecting a limited data access mode that reduces method execution time by limiting the fields accessed to only the selected field.

* * * * *